(12) United States Patent
Jiang et al.

(10) Patent No.: US 6,259,483 B1
(45) Date of Patent: Jul. 10, 2001

(54) ACCURATE ON-SITE REFERENCE FOR AUTOMATIC SIZE AND POSITION ADJUSTMENT

(75) Inventors: Libiao Jiang; Masanobu Kimoto; Taro Tadano, all of San Diego, CA (US)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 0 days.

(21) Appl. No.: 09/165,171

(22) Filed: Oct. 1, 1998

(51) Int. Cl.[7] .............................. H04N 5/04; H04N 3/22; H04N 3/227

(52) U.S. Cl. .......................... 348/511; 348/580; 348/747; 348/806

(58) Field of Search ................................... 348/511, 746, 348/747, 806, 807, 580, 581; H04N 5/04, 3/22, 3/227

(56) References Cited

U.S. PATENT DOCUMENTS 4,739,403 * 4/1988 Mark ..................................... 348/511

* cited by examiner

Primary Examiner—Sherrie Hsia
(74) Attorney, Agent, or Firm—Blakely, Sokoloff, Taylor & Zafman LLP

(57) ABSTRACT

Determining a phase shift compensation for automatically centering an image by measuring a start time delay between a horizontal scan line signal and an active video signal, measuring an end time delay between the active video signal and the horizontal scan line signal, and computing a phase shift for a horizontal flyback signal using the start time delay and the end time delay. A system to center an image on a monitor includes a video processing circuit and a rasterizer. The video processing circuit receives a video signal and measures a start time delay and an end time delay between a horizontal scan line signal and an active video signal. The circuit generates a phase shift used to generate a horizontal flyback signal using the measured start time delay and the end time delay. The rasterizer receives the output of the video processing circuit to control a scanning element.

15 Claims, 5 Drawing Sheets

ACCURATE ON-SITE REFERENCE FOR AUTOMATIC SIZE AND POSITION ADJUSTMENT

BACKGROUND OF THE INVENTION

1. Field of the Invention

The present invention relates to display systems. In particular, the invention relates to adjusting the size and position of an image on a display device.

2. Background Information

Display devices are often used to transmit information to a user. Display devices typically receive a video signal and convert the video signal into an image for a user to view. The video signal may be received from a variety of sources such as a microprocessor in a computer system, a video storage media such as a video cassette recorder or a television transmission. Examples of devices which are used as display devices or monitors include cathode ray tubes (CRT) devices, liquid crystal display (LCD) devices, and plasma devices.

One common display device is a cathode ray tube (CRT). FIG. 1 illustrates a typical cross-section of a CRT 100. In CRT 100, an electron gun 104 shoots an electron beam 108 through a set of magnets 112 to a fluorescent screen 116. When electrons within the electron beam 108 strike the fluorescent screen 116, the energy of the electrons excites a phosphorous coating causing the fluorescent screen 116 to emit light 120 photons.

The set of magnets 112 direct where the electron beam 108 strikes the fluorescent screen 116. Typically, the set of magnets 112 includes a top magnet 124 and a bottom magnet 128 as well as a first side magnet 132 and a second side magnet 136. Top magnet 124 and bottom magnet 128 move electron beam 108 from the top 130 of the fluorescent surface 116 to the bottom 131 of the fluorescent surface while side magnets 132, 136 move electron beam 108 in a horizontal direction 138 across fluorescent screen 116. Each sweep of the electron beam 108 in a horizontal direction 138 forms a scan line 140 on fluorescent screen 116. Once a scan line 140 has been formed, the vertical magnets including top magnet 124 and bottom magnet 128 apply slightly different magnetic fields to move the electron beam to a new starting position 141 and allow side magnets 132, 136 to again sweep the electron beam across the surface of the fluorescent screen 116 to form an adjacent or subsequent scan line 142. By rapidly moving the electron beam across the screen, a series of scan lines forms an image for display on fluorescent screen 116.

Electronics 144 control the electro magnetic fields created by the set of magnets 112. Electronics 144 also control the firing of electron gun 104. The video electronics 144 typically does this by processing video signals arriving from a processor such as a microcomputer 148. However, current electronics typically do not automatically process the video signal to precisely center an image and properly adjust the size of an image for a particular monitor. Current systems allow manual centering and sizing of an image using physical controls on the screen. Such manual control is awkward and inefficient.

Thus, a method of processing of automatically centering an image and properly setting the resolution of the screen is needed.

SUMMARY OF THE INVENTION

A system and method to center and size an image are discussed. In the method, a measuring circuit measures a start time delay between a synchronization point and a horizontal sync signal and an active video signal. The measuring circuit also measures an end time delay between a second synchronization point and an active video signal. Using the measured start time delay and the measured end time delay, a horizontal flyback signal is generated and used to center and size an image.

BRIEF DESCRIPTION OF THE DRAWINGS

The following drawings disclose various embodiments of the present invention for purposes of illustration only and are not intended to limit the scope of the invention.

DETAILED DESCRIPTION

The present invention is a method and apparatus to size and center an image. The system includes a digital processing circuit that receives a video signal and a horizontal sync signal to generate a flyback signal. A tailored value, such as a H_RETRACE value is programmed into the video processing circuit during the manufacturing process. The system uses the programmed H_RETRACE value, the horizontal sync signal, video signal and the horizontal sync signal to accurately center and size the image.

The description includes certain details and describes display device types including liquid crystal display (LCD) devices, cathode ray tube (CRT) devices, plasma display devices, and other forms of converting an electrical signal into a viewable image. The invention also describes sources of video signals such as computer systems, television broadcasts, digital video discs (DVD), videotape, and other sources of video information. Such description and details are provided to provide an understanding of the invention. However, those skilled in the art will appreciate that the invention may be practiced without these specific details and that other embodiments including other well-known methods, procedures, components and circuits which are not described in detailed in detail can be used to implement the described invention. Thus, the details presented in this description should not be used to limit the invention to only the embodiment described.

Figure 1:
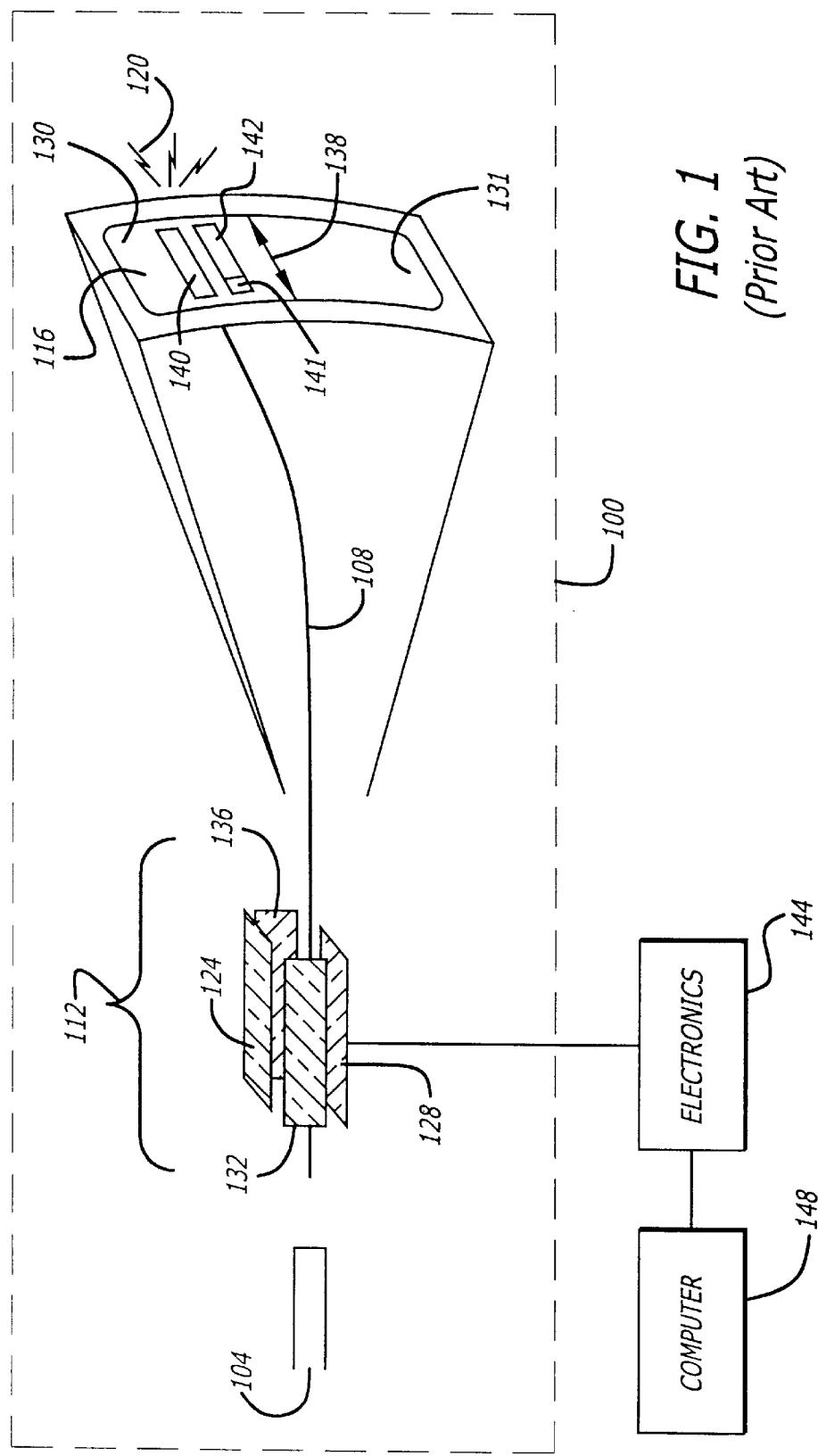
FIG. 1 illustrates a cross section of a cathode ray tube display device.
Figure 2:
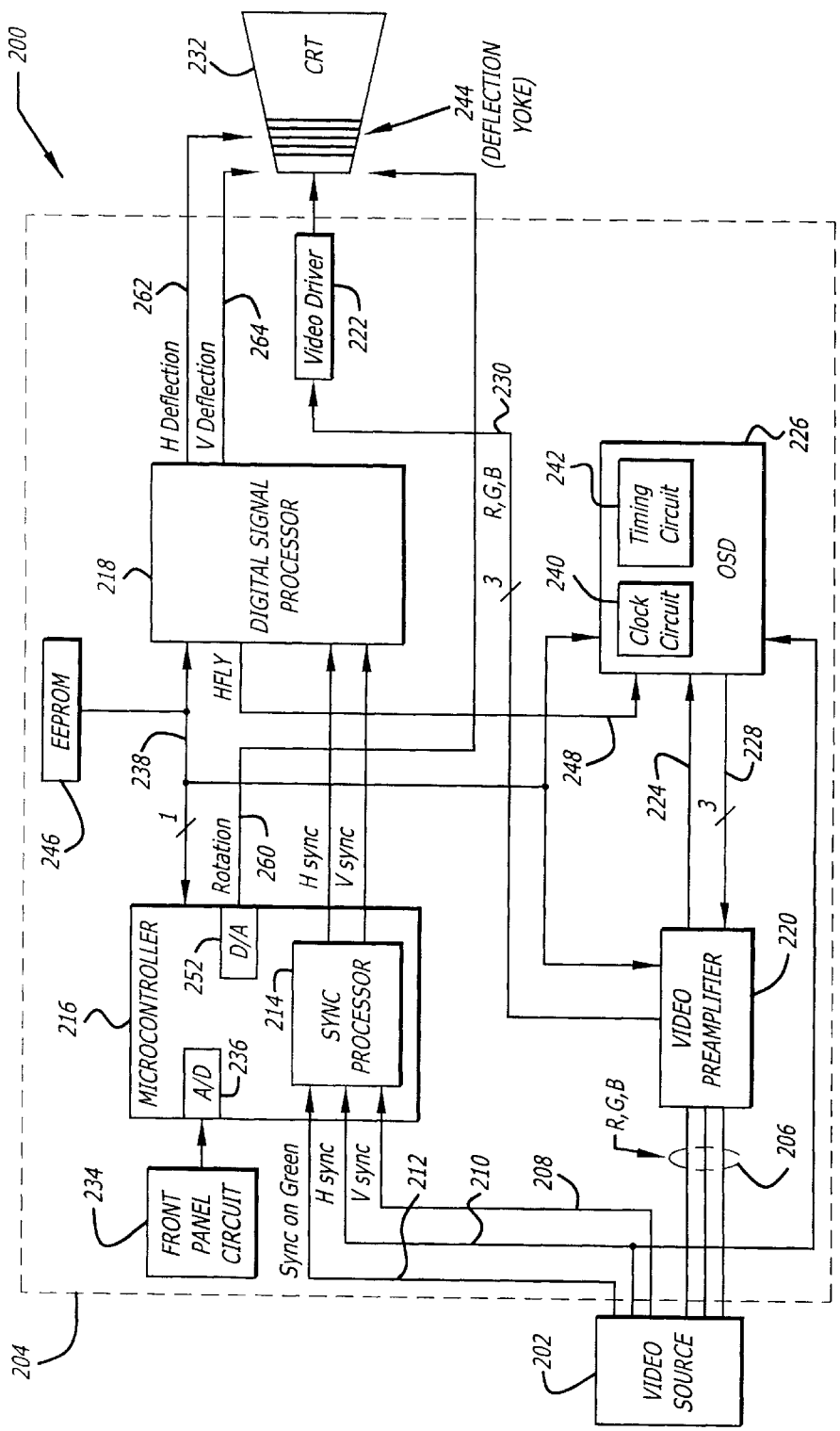
FIG. 2 is a block diagram illustrating circuits used to process the incoming video signals in one embodiment of the present invention.

FIG. 2 illustrates a system 200 for processing video information according to one embodiment of the present invention. In FIG. 2, video source 202 (e.g., a personal computer) provides a video signal to a video processing circuit 204 along signal lines 206, 208, 210, and 212. Typically, video source 202 provides a vertical sync signal along signal line 208, a horizontal sync signal along signal line 210, and a sync on green signal on signal line 212, all of which are coupled to a sync processor 214 contained within a microcontroller 216. In another embodiment, the sync processor 214 may be external to the microcontroller 216 as a stand-alone device or part of another device. The sync processor 214 processes the incoming sync signals, and extracts HSYNC and VSYNC signals that are in a uniformed format. The HSYNC and VSYNC signals are coupled to a digital signal processor (DSP) 218 for providing deflection and convergence.

The video source 202 also provides a red signal, a green signal, and a blue signal along signal lines 206, which are coupled to a video preamplifier circuit 220. The video preamplifier circuit 220 amplifies the red, green, and blue signals for transmission to a video driver circuit 222. The video preamplifier circuit 220 also combines the red, green, and blue signals to generate an active video signal, which indicates the active video time for displaying images. The active video signal is transferred to an on-screen display (OSD) circuit 226 along signal line 224.

The OSD circuit 226 also provides video signals along signal lines 228 to the video preamplifier circuit 220. The video signals on signal lines 228 represent menus to be superimposed, responsive to inputs from a front panel circuit 234, on the video signals received by the video preamplifier circuit 220 on signal lines 206. The front panel circuit 234, which is typically attached to the front of the display, is coupled to the microcontroller 216 by way of an analog-to-digital converter (ADC) 236. In the embodiment shown, the ADC 236 is contained within the microcontroller 216, although it may be external to it. The front panel circuit 234 includes push buttons and/or switches for displaying menus on the CRT 232 and controlling display device parameters such as, but not limited or restricted to, brightness, contrast, horizontal and vertical adjustments, and the like. The microcontroller 216 receives the inputs from the front panel circuit 234 and issues commands to the OSD circuit 226 along a bus 238. The bus includes all signals (address, data, and control) for transmitting data between devices. The bus may be a serial bus or a parallel bus.

Thus, the video preamplifier circuit 220 mixes and superimposes the video signals received from the OSD 226 along signal lines 228, if any, with the red, green, and blue signals on signal lines 206 received from the video source 202, and then amplifies the mixed video signal. The output of the video preamplifier circuit 220 is applied to the video driver circuit 222 along signal line 230. The video driver circuit 222 converts the video signal into a larger signal for driving the display device 232, and regulates the strength of the electron beam by adjusting the signal strength.

Continuing to refer to FIG. 2, the microcontroller 216 generates a rotation signal, which is transmitted to the deflection yoke 244 along signal line 260, for controlling the tilt. Since the rotation signal is an analog signal, the output of the microcontroller 216 is fed to a digital-to-analog converter (DAC) 252 which converts the digital value into an analog signal. An external electrically erasable read only memory ("EEROM") device 246 is coupled to the microcontroller 216, although such device may be contained therein. The EEPROM device 246 stores a number of predetermined values, which are loaded into the microcontroller 216 upon power up, as will be described below. The microcontroller 216 is coupled to the DSP 218, OSD 226, and the video preamplifier circuit 220 by way of the bus 238.

The DSP 218 generates a horizontal deflection signal and a vertical deflection signal to the deflection yoke 244 of the CRT 232 for controlling the electron beam. The horizontal deflection signal is transmitted to the deflection yoke 244 along signal line 262, and the vertical deflection signal along signal line 264. The DSP 218 also generates a horizontal fly (HFLY) signal, which indicates when the electron beam is to be moved to a new scan line. Thus, when the HFLY signal is asserted, the horizontal and vertical deflection signals control the deflection yoke 244 to move the electron beam to a new scan line. The HFLY signal is transmitted to the OSD circuit 226 along signal line 248.

The HFLY signal may be adjusted in order to center the active video signal. To adjust the HFLY signal, a feedback loop is utilized which includes the OSD circuit 226, the microcontroller 216, and the DSP 218.

The OSD circuit 226 receives the active video signal along signal line 224, the horizontal sync signal from the output of sync processor 214 along signal line 219, and the HFLY signal from the DSP 218 along signal line 248. In one embodiment of the invention, the OSD circuit 226 measures characteristics of the video signal with respect to the horizontal sync signal and the HFLY signal, and communicates the measured characteristics to the microcontroller 216. In order to properly measure the characteristic, the OSD circuit 226 typically includes an OSD clock circuit 240 and timing circuits 242 to measure the time delay between rising and/or falling edges of various signals.

Figure 3:
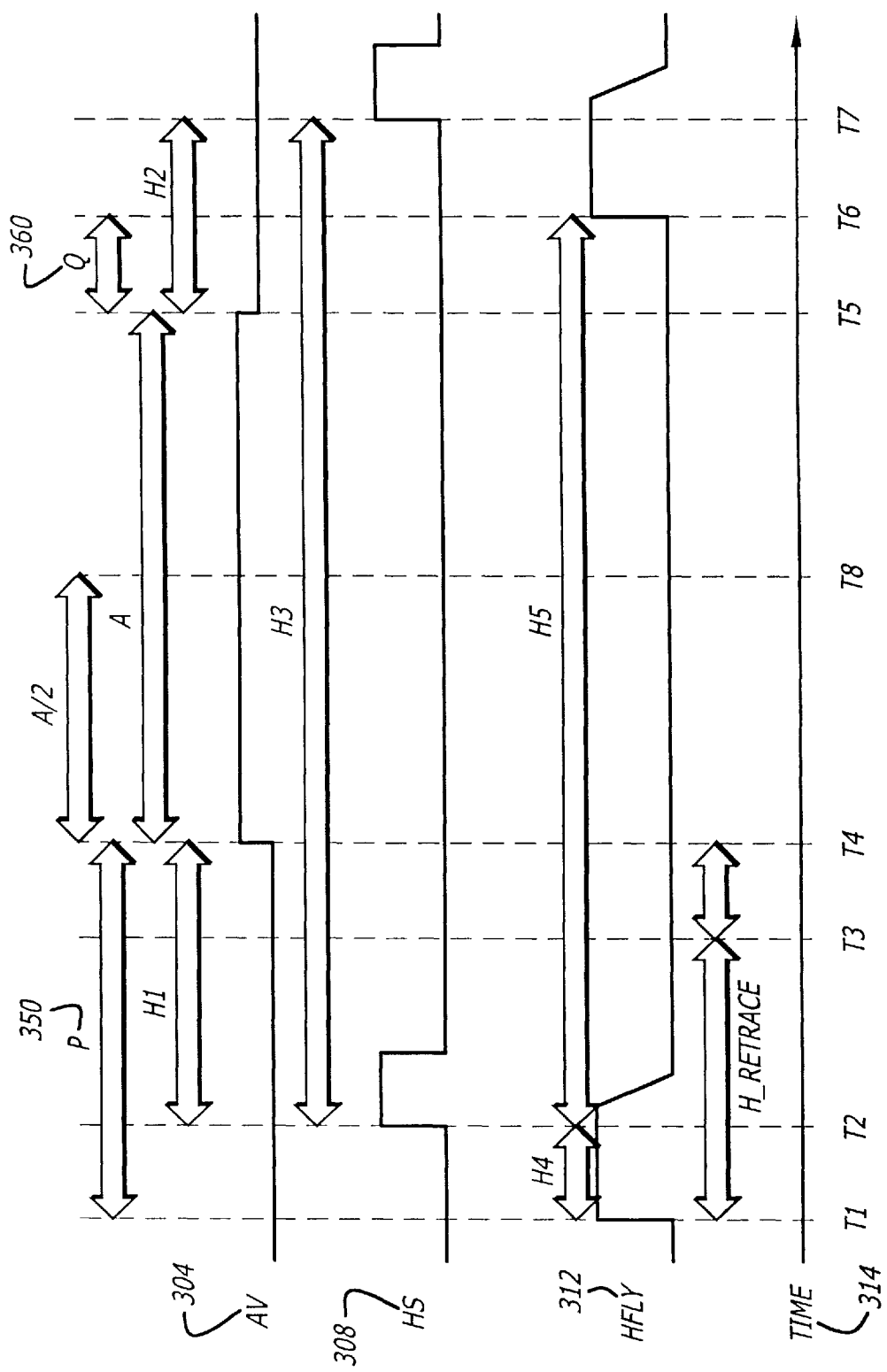
FIG. 3 is a timing diagram illustrating the relationship between an active video signal (AV), a horizontal sync signal (HS), and a horizontal fly signal (HFLY), according to one embodiment of the present invention.

FIG. 3 is a timing diagram illustrating the relationship between an active video signal (AV) 304, a horizontal sync signal (HS) 308, and a horizontal fly signal (HFLY) 312, according to one embodiment of the present invention. The sync processor 214 provides the HS signal 308, the video preamplifier circuit 220 provides the AV signal 304, and the DSP 218 provides the HFLY signal 312 to the OSD circuit 226. The states of the signals at particular points in time along the time axis 314 are illustrated, where significant points are marked as T1, T2, T3, T4, T5, T6 and T7 for reference purposes.

Referring to FIG. 3, the AV signal 304 indicates when along time axis 314 the electron beam in a display device (e.g., CRT 232) switches on to cause elements in the screen to fluoresce. In the illustrated embodiment, an image region of AV signal 304 is defined by a square pulse between times T4 and T5. Time T4 defines the first edge or left end of an image to be displayed whereas time T5 indicates the second edge or right end of the image to be displayed. In the embodiment shown, the video preamplifier 232 combines the separate red, green, and blue signals into the single AV signal 304. However, in another embodiment, the AV signal 304 may be repeated multiple times, one for each color being transmitted.

The HS signal 308 is a series of square pulses. The rising edges occur at times T2 and T7, where each rising edge indicates the start of a new scan line. Thus, on the rising edge of the horizontal sync signal 308 at time T2, a new scan line begins. The start of new scan lines may also occur on a falling edge of a pulse rather than a rising edge. For purposes of this application, the shape and form of the HS signal 308 are not important, only that the HS signal begins a new scan line.

The HFLY signal 312 determines when the electron beam moves back to a fixed starting point. In the illustrated embodiment, the rising edge of the HFLY signal 312, occurring at times T1 and T6, causes the electron beam to move to the beginning of a new scan line. The DSP 218 generates the HFLY signal 312 using a H-Phase value output by microcontroller 216. The actual movement of the electron beam may be achieved by adjusting the horizontal and vertical deflection signals in the DSP 218.

HFLY signal 312 is adjusted using measured P and Q values. OSD measure the P and Q parameters from a current HFLY signal. A microcontroller receives the measured P and Q parameters, hereinafter the original P and Q parameters from the current HFLY signal and computes an H-Phase value. The H-Phase value is transmitted to a DSP 218 which uses the H-Phase value to generate a subsequent HFLY signal. The subsequent HFLY signal is then transmitted to the OSD where a subsequent P and Q parameter based on the subsequent HFLY signal can be measured. The subsequent P and Q parameter are also transmitted to microcontroller 216. If the subsequent P and Q parameters results in a P–Q value closer to a tailored H-RETRACE value then the original P–Q value, the image on the display device is better centered and the adjustments to H-Phase and HFLY are going in a proper direction. If the new P and Q parameter produces a P–Q value further from the tailored H-RETRACE value, then the image on the display device is further off-center. By adjusting the H-phase, and thereby adjusting the HFLY signal in the described feedback loop, an optimum HFLY signal to approach P–Q=H-RETRACE can be generated.

In one embodiment of the invention, the OSD circuit 226 continuously measures time delays H1–H5. The first time delay H1, occurring between times T2 and T4, is a measure of the time between the start of a horizontal scan line (rising edge of HS signal 308) and the start of the active picture (rising edge of AV signal 304). The second time delay H2, occurring between times T5 and T7, is a measure of the time between the end of the active picture (falling edge of AV signal) and the beginning of a new scan line (rising edge of HS signal). The time period of the HS signal 308 is given by a H3, which occurs between times T2 and T7. A fourth time delay H4, which occurs between times T1 and T2, is a measure of the time between the start of the HFLY signal 312 and the start of the HS signal 308. In addition, a fifth time delay H5, occurring between times T2 and T6, is a measure of the time between the rising edge of the HS signal 308 and the rising edge of the HFLY signal 312.

Typically the period of the HFLY signal 312 between times T1 and T6 is the same as the period of the HS signal 308 between times T2 and T7. However, the HFLY signal 312 is shifted from the HS signal 308 by a phase shift H4. In the illustrated embodiment, the retrace time is given by H-RETRACE, occurring between times T1 and T3. The retrace time is a physical characteristic of a display and is the time it takes the display to start a new scan line. In the case of a CRT display, the retrace time is the time it takes to move the electron beam from an ending position of a scan line to a starting position of a subsequent scan line.

An accurate H-RETRACE value is very important to properly center an image. However, the H-RETRACE value is sensitive to changes in slight variations in the components used to build a standard monitor. In order to insure an accurate H-RETRACE value, each monitor is individually programed with a "tailored value", typically a corresponding H-RETRACE value. In one embodiment of the invention, the individual programming occurs during monitor assembly. A worker or automated unit may inpect a monitor and adjust an image to be properly center. When the image is properly centered, a unit specific H-RETRACE value, or "tailored H-RETRACE value" may be computed from the centered image and stored. The H-RETRACE value is stored in the EEPROM device 246 and is loaded into the microcontroller 216 upon reset.

Once the OSD circuit 226 measures the H1–H5 values, they are transmitted to the microcontroller 216. A HFLY start time delay P is defined as the time delay between the rising edge of the HFLY signal (time T1) and the rising edge of the AV signal (time T4). A corresponding HFLY end time delay Q is defined as the time delay between the falling edge of the AV signal (time T5) and the rising edge of a subsequent HFLY signal (time T6).

After the microcontroller 216 receives the H1–H5 values from the OSD circuit 226, the microcontroller calculates P and Q values for the current H1–H5 values. The P value is derived from the equation P=H1+H4, and the Q value is derived from the equation Q=H2−H4. When the active video region is properly centered, the P and Q values are defined by $P_0$ and $Q_0$ and meet the condition $$P_0 - Q_0 = \text{horizontal retrace time (H-RETRACE).} \quad (1)$$

Equation (1) may be used both to (1) program an accurate value of H-RETRACE into a display device and (2) to center subsequent images on the display device. In the manufacture of the display device, an image input into the monitor is adjusted to accurately center the image. The H-RETRACE may then be computed from measured P and Q parameters. In one embodiment of the invention, the OSD circuit is used to measure the P and Q parameters. The H-RETRACE time is computed from P–Q and stored in a memory such as EEPROM 246.

Once H-RETRACE is stored in a memory, equation (1) is used to center subsequent images. To center the active portion A of the AV signal 304 in the screen of display device 232, the P and Q values are adjusted. Both P and Q are a function of the phase shift H4. Thus, in order to change the phase shift H4, the HFLY signal 312 is adjusted. A number of method may be used to compute phase shift H4. In one embodiment, the phase shift H4 is computed in an iterative process.

As previous described, the OSD circuit measures the distance between rising edge pulses of the HS signal, the HFLY signal and the AV signal to determine H1–H5. However, each of these three signals undergoes time delays resulting from a number of factors. These factors include (1) different circuit elements in the circuit path of each signal resulting in a corresponding time delay, (2) different frequencies used to transmit each of these signals result in a different time delay, even through identical circuit components (for example, a horizontal sync signal is typically on the order of 25 kilohertz to 100 kilohertz while the active video signal is typically on the order of 80 Hz), and (3) different triggering (positive polarity and negative polarity) results in different delays through processing integrated circuits. These delays should be corrected or normalized to a reference in order to optimize the accuracy of the H1–H5 used to center an image and determine an image size. In one embodiment of the invention, microcontroller 216 of FIG. 2 computes a compensated H1, H2, H4, H5 which accounts for the different delays using the formulas:

$$H1 = (\text{measured } H1)^*(OSD \text{ clock factor}) + (H1 \text{ compensation}) + (H1 \text{ compensation for input polarity}). \quad (a)$$

$$H2 = (\text{measured } H2)^*(OSD \text{ clock factor}) + (H2 \text{ compensation}) + (H2 \text{ compensation for input polarity}); \quad (b)$$

$$H4 = (\text{measured } H4)^*(OSD \text{ clock factor}) + (H4 \text{ compensation}) + (H4 \text{ compensation for input polarity}); \quad (c)$$

and $$H5 = (\text{measured } H5)^*(OSD \text{ clock factor}) + (H5 \text{ compensation}) + (H5 \text{ compensation for input polarity}). \quad (d)$$

Each of the preceding formulas includes four terms. The first term is a measured value, for example, H1, H2, H3, H4, H5 which is measured by the on-screen display (OSD) circuit. The measured H1, H2, H3, H4, and H5 are multiplied by a second term, the OSD clock factor which is determined by the period of the clock timing the OSD chip.

For example, if the OSD chip is timed by a clock with a ten nanosecond period, the OSD clock factor would be approximately 10 nanoseconds.

Each formula also includes a third term, a compensation component, for example the H1 compensation, H2 compensation, H4 compensation, H5 compensation terms. The compensation components compensate for the variations in time delays which occur from propagating and processing different signals with different frequencies through video processing circuitry. The different carrier frequencies result in different time delays which are corrected using the compensation components.

In one embodiment of the invention, the compensation components are pre-programmed into registers in a memory device such as an external electrically erasable read only memory ("EEROM") device 246 or an electronically programmable read only memory ("EPROM") coupled to the microcontroller 216. In one embodiment, the units of the compensation factor are in units of the OSD clock factor, thus, when the OSD clock factor is 10 nanoseconds, the compensation factor is provided in 10 nanosecond increments.

The last term of equations (a), (b), (c), and (d) is an input polarity compensation factor. The compensation factor for input polarity is determined by the polarity of the received horizontal sync signals. Typically, the video processing circuit and the first compensation factor are computed for a predetermined or "default" polarity. Circuits, such as integrated circuits 203 which process the horizontal sync and RGB signals before the signals are received by the video processing circuit 204 typically have different rise time and fall time delays. Thus, a different delay results depending on whether a received signal has a positive or a negative polarity. When the polarity is different from the predetermined polarity, a non-zero polarity compensation factor is desirable.

In one embodiment of the invention, the input polarity is determined by a sync processor 214 of FIG. 2. The sync processor includes a timing circuit to determine a percentage of time the horizontal sync signal is high compared to a percentage of time the horizontal sync signal is low. When the horizontal sync signal is at a low value over 50% of the time, the input polarity is defined to be positive. When the horizontal sync signal is high over 50% of the time, the horizontal sync signal is defined to be negative.

The first compensation component, e.g. H1 compensation, is defined for a positive polarity horizontal sync signal. Thus, when a received horizontal sync signal has a positive polarity, the compensation factor for polarity is zero. When the received horizontal sync signal has a negative polarity, the polarity compensation factor may be determined from the difference in time delays between a rising edge and a falling edge of preprocessing circuitry such as integrated circuits 203. The difference value may be determined from integrated circuit specifications or may be measured. The difference value may be stored in a memory such as EPROM 246 of FIG. 2 for use by microcontroller 216 in determining equations (a), (b), (c), and (d).

Microcontroller 216 computes a compensated set of H1, H2, H4, H5 values using formulas (a), (b), (c) and (d). The compensated values are modified by the video processing circuit in a feedback loop to center an image in a screen of a display device. In order to center the active video relative to the screen edges, the video processing circuit determines a P parameter 350, the start time delay of the active video relative to the start of the horizontal fly signal 312 and also a Q parameter 360, the horizontal fly end time delay determined by the time delay from the end of the active video signal to the start of the next scan line. When the image or the active video region is centered, the P and Q values are defined by $P_0$ and $Q_0$ and meet the condition:

$$P_0 - Q_0 = \text{horizontal retrace time;} \qquad (1)$$

Where the horizontal retrace time is the time period needed to move an indicator such as an electron beam in position to start a new scan line. By definition, when H4 is less than or equal to H5, then:

$$P_0 = H1 + H4; \qquad (2)$$

$$Q_0 = H2 - H4; \qquad (3)$$

and

When H4 is greater than H5, then:

$$P_0 = H1 - H5; \qquad (4)$$

$$Q_0 = H2 + H5. \qquad (5)$$

Thus, substituting equations (2) and (3) into equation (1) results in $$P_0 - Q_0 = H1 - H2 + 2*H4 \qquad (6)$$

when H4 is less than or equal to H5.

Substituting equations (4) and (5) into equation (1) results in:

$$P_0 - Q_0 = H1 - H2 - 2*H5 \qquad (7)$$

when H4 is greater than H5.

In one embodiment of the invention, the feedback loop which includes the OSD circuit, the microcontroller, and the digital signal processor continuously adjusts H4, the phase shift of the HFLY circuit with respect to the horizontal sync signal to meet the conditions defined in equations (6) and (7). In an optimized system, the horizontal sync signal may be a compensated horizontal sync signal.

In one embodiment of the invention, a center of the active video signal on a display device, time T8, is determined by dividing A, the active time period, by two and adding the result to the start time delay. The feedback loop adjusts H4, the phase shift of the HFLY circuit with respect to the horizontal sync signal, such that the center of the active video signal is in the center of a display. In an optimized system, the horizontal sync signal may be a compensated horizontal sync signal.

The measured H1, H2, H3, H4, and H5 may also be used to determine image size. In one embodiment of the invention, the measured H1, H2, H3, H4, H5 values are used to determine "blanking regions". Blanking regions are regions between the edge of an image and the edge of a screen of a display device. A first blanking region is the region between the start of a scan line to the start of an image. In FIG. 3, the first blanking region occurs between time T3 and time T4. The first blanking region may be expressed by the equation (P)−(H_RETRACE). A second blanking region is the region between a second edge of an image and the end of a scan line. The second blanking region is defined by the Q parameter between time T5 and time T6 of FIG. 3. When the first blanking region and the second blanking region exceed a predetermined value, the size of the image may be increased.

A second method of computing image size is to determine an ideal or "target image size" for a particular display device. The "raster size", the size of dots or pixels used to form an image is then adjusted to generate an image with the approximate target image size. In one embodiment of the invention, the raster size is calculated by setting:

$$\text{Raster size} = \frac{\text{target image size}}{\text{Active Video Ratio}}$$

wherein the Active Video Ration is defined by:

$$\text{Active Video Ratio} = \frac{H3 - H1 - H2}{H3 - H\ RETRACE}$$

Substituting the Active Video Ratio into the equation for raster size results in:

$$\text{Raster size} = \frac{H3 - HRETRACE}{H3 - H1 - H2} \times \text{Target Image Size}$$

Figure 4A:
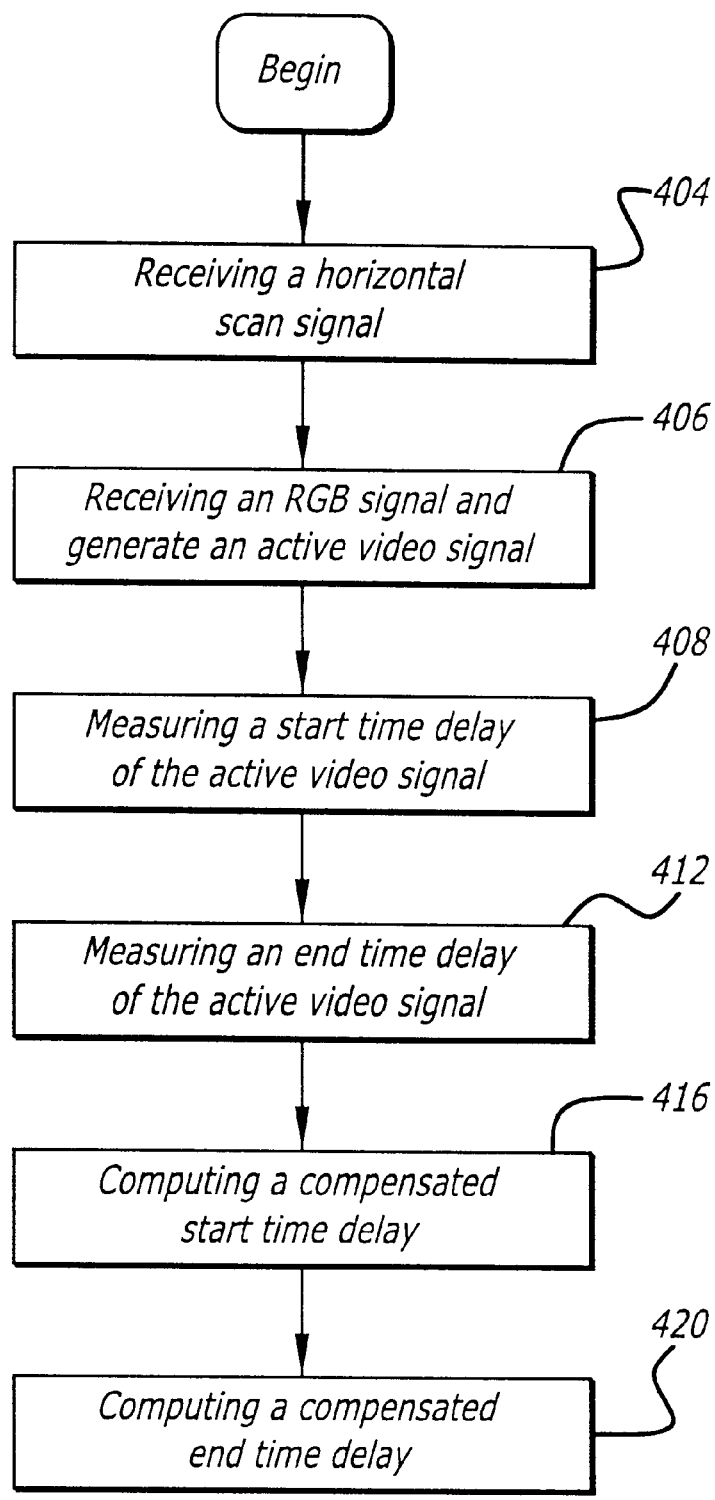
FIGS. 4A and 4B illustrate flow diagrams illustrating one method of implementing the present invention.
Figure 4B:
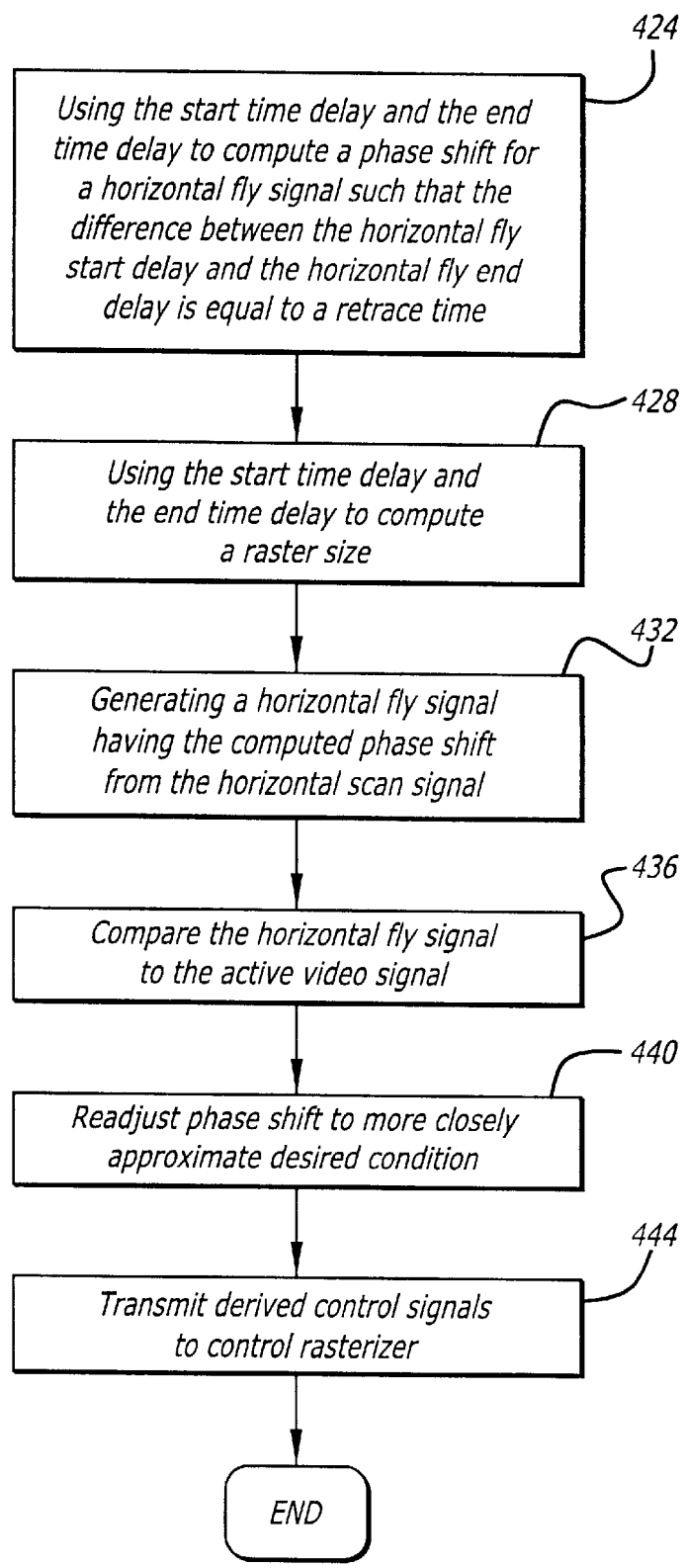

FIGS. 4A and 4B are flow charts describing the processing of the video signal using one embodiment of the present invention. In block 404 the microcontroller or video processing circuit receives a horizontal sync signal. In block 406 the video processing circuit receives an RGB signal and uses the RGB signal to generate an active video signal. In one embodiment of the invention, a video preamplifier generates the active video signal. A variety of sources, including but not limited to personal computers, television signals, or other video content providers, may be used to generate the horizontal sync signal and the RGB signal.

The video processing circuitry measures the start time delay between the active video signal and the horizontal sync signal in block 408. In block 412, the video processing circuit also measures the end time delay between the active video signal and the horizontal sync signal. In one embodiment of the invention, a timing circuit in the on screen display circuit is used to measure the start time delay and the end time delay between the active video signal and the horizontal sync signal.

In one embodiment of the invention, a microcontroller in the video processing circuit uses the measured start and end time delay to compute a compensated start time delay and a compensated end time delay between the horizontal sync signal and the active video signal in blocks 416 and 420. The compensated start time delay and the compensated end time delay takes into account time delays which occur during transmission through the video processing circuit. These delays are often predetermined by measuring the characteristics of components in the video processing circuit. These delays or "compensation factors" are stored in memory such as an EEPROM, coupled to the video processing circuit. Other compensation factors, such as polarity compensation factors, compensate for time shifts which occur due to different polarities of the incoming horizontal sync signal. The computations in block 416 and block 420 may be executed using equations (a), (b), (c) and (d) as previously described.

In block 424, the video processing circuit uses the compensated start time delays and the end time delays computed in block 416 and block 420 to compute a phase shift. In one embodiment, the phase shift is computed for a horizontal fly signal such that the difference between the horizontal fly start delay and the horizontal fly end delay is approximately equal to a retrace time. The retrace time is defined as the time between the completion of a scan line and the resetting of a scan writing element, such as an electron beam, to a starting position to write a subsequent scan line.

In block 428 the start time delay and the end time delay is used to compute a raster size. It is understood that in an alternative embodiment of the invention the processing circuit may use the measured active video time period instead of the start and end time delays. The active video time period, the start time delay, and the end time delay are inter-related. The sum of the active video period, the start time delay and the end time is equal to the period of the horizontal sync signal.

In block 432 a horizontal fly signal is generated using the computed phase shift from block 424. In one embodiment of the invention, the microcontroller converts the computed phase shifts into a H-phase value and transmits the H-phase value to a digital signal processor in the video processing circuit. The digital signal processor generates the horizontal fly signal (HFLY). The generated HFLY signal is transmitted to a measuring circuit within the OSD for measurement of time delays between the HFLY signal and the active video signal in block 436. Using the relative time delays, the phase shift is readjusted in block 440 in a feedback loop to more closely approximate a desired condition. An example of such condition is to satisfy the P–Q=retrace time condition.

A digital signal processor in the digital processing circuit uses the HFLY signal to generate control signals, such as H deflection, to control a display device. The derived control signals are transmitted to control a rasterizer in block 444. When the display device is a CRT, the H deflection may be used to direct the deflection of an electron beam generating an image on a phosphorous screen.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of determining a phase shift compensation for automatically adjusting an image characteristic comprising:

measuring a start time delay between a horizontal scan line signal and an active video signal;

measuring an end time delay between the active video signal and the horizontal scan line signal;

computing a phase shift for a horizontal flyback signal using the start time delay and the end time delay; and comparing the computed phase shift with a tailored value to determine whether the image characteristic has been optimized.

2. The method of claim 1 wherein an on screen display chip measures the start time delay and the end time delay.

3. The method of claim 1 further comprising:

multiplying the start time delay by a clock factor, the clock factor being a multiple of the point of a clock circuit which provides timing for a measuring circuit which measures the start time delay.

4. The method of claim 3 further comprising:

adding a compensation factor to the measured start time delay to compensate for the shifting of the horizontal scan line signal with respect to the active video signal.

5. The method of claim 1 further comprising:

measuring an active time period from the rising edge of the active video signal to the falling edge of the active video signal;

determining a center of the active video signal on a display device by dividing the active time period by two and adding the result to the start time delay; and adjusting the phase shift of the horizontal flyback signal such that the center of the active video signal is in the center of a display.

6. The method of claim 1 further comprising:

generating the horizontal flyback signal;

measuring a horizontal flyback start time delay and a horizontal flyback end time delay between the horizontal flyback signal and the active video signal; and readjusting the phase shift to improve centering of the image.

7. A system to center an image on a display device comprising:

a video processing circuit to receive a video signal and measure a start time delay and an end time delay between a horizontal scan line signal and an active video signal, the circuit generating a phase shift used to generate a horizontal flyback signal using the measured start time delay and the end time delay; and a video drive of the display device to receive the output of the video processing circuit to control a scanning element.

8. The system of claim 7 further comprising a digital to analog converter to convert the output of the video processing circuit to an analog signal for use by the video drive.

9. The system of claim 7 wherein the video processing circuit includes a microcontroller circuit and an on-screen display circuit, the on-screen display circuit to measure the start time delay and the end time delay, the microcontroller circuit using the start time delay and the end time delay from the on-screen display circuit to generate the horizontal flyback signal.

10. The system of claim 9 wherein the on-screen display circuit superimposes menu information over the active video signal, the menu information for display by a monitor.

11. The system of claim 7 wherein the scanning element is an electron gun to produce an electron beam.

12. The system of claim 7 wherein the horizontal flyback signal has the same period as the horizontal scan line signal but includes a phase shift equal to the difference between the start time delay and an average of the start time delay with the end time delay added to half a retrace time.

13. The system of claim 7 wherein the active video signal is an analog signal and the horizontal scan line signal is a digital signal.

14. A method of sizing an image comprising:

computing a horizontal flyback signal using a start time delay and an end time delay between a horizontal sync signal and an active video signal;

determining a blanking region between the horizontal flyback signal and the active video signal; and readjusting a size of the image when the blanking region exceeds a predetermined dimension.

15. The method of claim 14 wherein the size of the image is increased by increasing a raster size.

\* \* \* \* \*